US012597556B2

(12) United States Patent
Kim et al.

(10) Patent No.: US 12,597,556 B2
(45) Date of Patent: Apr. 7, 2026

(54) TRANSFORMER DEVICE AND ELECTRONIC DEVICE COMPRISING SAME

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 763 days.

(21) Appl. No.: 17/961,244

(22) Filed: Oct. 6, 2022

(65) Prior Publication Data

US 2023/0035452 A1 Feb. 2, 2023

Related U.S. Application Data

(63) Continuation of application No. PCT/KR2021/003645, filed on Mar. 24, 2021.

(30) Foreign Application Priority Data

Apr. 6, 2020 (KR) ........................ 10-2020-0041607

(51) Int. Cl.
*H01F 27/29* (2006.01)
*H01F 27/02* (2006.01)
(Continued)

(52) U.S. Cl.
CPC ............. *H01F 27/40* (2013.01); *H01F 27/02* (2013.01); *H01B 7/04* (2013.01)

(58) Field of Classification Search
CPC . H01B 7/04; H01F 27/06; H01F 38/00; H01F 2038/006; H01F 27/306;
(Continued)

(56) References Cited

U.S. PATENT DOCUMENTS 2,975,298 A * 3/1961 Carpenter .............. H03K 17/80 336/155
3,374,398 A * 3/1968 Horn ........................ H02H 3/34 361/87
(Continued)

FOREIGN PATENT DOCUMENTS

CN 110085390 A 8/2019
JP 2005-175403 A 6/2005
(Continued)

OTHER PUBLICATIONS

Written Opinion (PCT/ISA/237) issued Jul. 23, 2021 by the International Searching Authority in International Application No. PCT/KR2021/003645.
(Continued)

*Primary Examiner* — Mang Tin Bik Lian
(74) *Attorney, Agent, or Firm* — Sughrue Mion, PLLC

(57) ABSTRACT

A transformer device includes a transformer circuit having a shape arranged to be connected to another transformer device, and a connector provided on one side of the transformer circuit such that the transformer circuit is connected to a cable connected with another transformer device where the transformer circuit is configured to be connected to a transformer circuit of another transformer device through the cable to increase a voltage or current provided to a load.

14 Claims, 14 Drawing Sheets

(51) Int. Cl.
*H01F 27/40* (2006.01)
*H01B 7/04* (2006.01)

(58) Field of Classification Search
CPC ...... H01F 1/0315; H01F 17/045; H01F 27/29; H02M 3/003
See application file for complete search history.

(56) References Cited

U.S. PATENT DOCUMENTS

| | | | | |
|---|---|---|---|---|
| 3,541,428 | A * | 11/1970 | Schwarz | H01F 19/02 331/113 R |
| 2005/0270745 | A1 | 12/2005 | Chen et al. | |
| 2008/0150664 | A1* | 6/2008 | Blankenship | H05H 1/36 336/175 |
| 2010/0011568 | A1 | 1/2010 | Harding | |
| 2010/0079229 | A1 | 4/2010 | Koprivnak et al. | |
| 2012/0038444 | A1* | 2/2012 | Wu | H01F 27/02 336/90 |
| 2012/0280779 | A1* | 11/2012 | Shih | H01F 27/366 336/196 |
| 2015/0109073 | A1* | 4/2015 | Guillot | H04B 3/28 333/177 |
| 2016/0086711 | A1* | 3/2016 | Fu | H01F 27/24 336/65 |
| 2018/0138801 | A1* | 5/2018 | Chen | H01F 27/2804 |
| 2019/0043660 | A1* | 2/2019 | Jin | H02M 3/33592 |
| 2019/0156993 | A1 | 5/2019 | Lou et al. | |
| 2019/0362885 | A1* | 11/2019 | Lu | H01F 27/29 |
| 2022/0084737 | A1* | 3/2022 | Lai | H02M 1/0064 |
| 2022/0277881 | A1* | 9/2022 | Masadome | H01F 27/40 |
| 2022/0359117 | A1* | 11/2022 | Polivka | H01F 27/24 |

FOREIGN PATENT DOCUMENTS

| | | |
|---|---|---|
| KR | 10-2007-0050907 A | 5/2007 |
| KR | 10-1153521 B1 | 6/2012 |

OTHER PUBLICATIONS

International Search Report (PCT/ISA/210) issued Jul. 23, 2021 by the International Searching Authority in International Application No. PCT/KR2021/003645.

Communication issued on Jul. 16, 2024 by the Korean Intellectual Property Office in Korean Patent Application No. 10-2020-0041607.

* cited by examiner

TRANSFORMER DEVICE AND ELECTRONIC DEVICE COMPRISING SAME

CROSS-REFERENCE TO RELATED APPLICATION(S)

This is a bypass continuation application of PCT/KR2021/003645 filed Mar. 24, 2021, which claims priority from Korean Patent Application No. 10-2020-0041607 filed Apr. 6, 2020, which disclosure is incorporated herein in its entirety.

BACKGROUND

1. Field

The disclosure relates to a transformer device which changes a characteristic value of applied power and outputs the power and an electronic device including the same, more specifically, a transformer device and an electronic device including the same which correspond to a slim type electronic device having a thin thickness.

2. Related Art

An electronic device including electronic components for computation such as a central processing unit (CPU), a chipset, a memory, etc. to compute and process information may be variously classified in accordance with what information will be processed or what it is used for. For example, the electronic device may be an information processing apparatus such as a personal computer (PC), a server or the like for processing general information, an image processing apparatus for processing image data, an audio apparatus for audio process, home appliances for miscellaneous household chores, etc. The image processing apparatus may be embodied as a display apparatus that displays an image based on processed image data on its own display panel.

Regardless of a type of the electronic device, the electronic device needs power to operate. Also, because a characteristic value of power to be needed may be different for each of parts which form the electronic device, the electronic device necessarily includes a power supply which changes power from an external power source into various characteristic values to be required and supplies the power to each part. As an example of the power supply, there is a switching mode power supply (SMPS) which is a type of adjusting input power using a gate controlled device and then changing voltage through electromagnetic coupling. The power supply consists of various parts including a transformer as a necessary part in a case of the power supply which is embodied as an isolation type circuit structure.

The transformer uses a theory of electromagnetic induction. The transformer has a structure of a core which is wound by a pair of coils isolated from each other. For example, the number of turns of an input side coil is high while the number of turns of an output side coil is low so that when the input side coil is applied with a high voltage, the input side coil becomes an electromagnet to form a magnetic field. The magnetic field is transferred to the output side coil via the core and forms an induced current in the output side coil. Such theory refers to as the electromagnetic induction. According to the method, the transformer adjusts a characteristic value such as a current or voltage of the applied alternate power and outputs the power to various loads. In this way, the transformer which performs roles of power transmission and electrical isolation is an important part in the power supply.

The present development direction of the electronic device, especially, the display device is pursuing slimness. For example, in the case of a television, the enlargement of a display panel is also proceeding in accordance with content development of 8K-grade resolution, where an area of the display panel which displays an image becomes larger while the thickness of the display panel becomes thinner. Various parts which are included in the display device, for example, the transformer also needs to have the thickness which becomes thinner to correspond to the trend.

However, in order to output power of the transformer of a same capacity as before while designing the thickness of the transformer to be thinner than before, the area of the transformer has to be increased. That is, in response to the slimness of the display device, the thickness of the transformer becomes thinner as well as the area of the transformer becoming larger. In such structure, the strength against an external pressure which is applied to a surface of the transformer becomes weaker and, consequently, danger where a crack may happen in the transformer, especially, the core is increased.

Accordingly, there may be required a transformer to be applied to a slim electronic device as embodied to realize the slimness and ensure the hardness.

SUMMARY

A transformer device according to an embodiment of the disclosure includes transformer circuitry having a shape arranged to be connected to another transformer device, and a connector provided on a side of the transformer circuitry so that the transformer circuitry is connected to a cable connected with the other transformer device, where the transformer circuitry is configured to be connected to a transformer circuitry of the other transformer device through the cable to increase a voltage or current provided to a load.

The cable may include a flexible cable.

The transformer circuitry of the transformer device and the transformer circuitry of the other transformer device are connected with each other in serial to increase the voltage provided to the load.

The transformer circuitry of the transformer device and the transformer circuitry of the other transformer device are connected in parallel to increase the current provided to the load.

The connector may be provided to be plural to form a plurality of connectors, and the plurality of connectors include one or more first connectors provided to connect the transformer circuitry of the transformer device and the transformer circuitry of the other transformer device in serial and one or more second connectors provided to connect the transformer circuitry of the transformer device and the transformer circuitry of the other transformer device in parallel.

The one or more first connectors may include a pair of first connectors provided on a first edge of the transformer circuitry of the transformer device and a second edge of the transformer circuitry of the transformer device opposing the first edge, respectively.

The one or more second connectors may include a pair of first connectors provided on a third edge of the transformer circuitry of the transformer device perpendicular to the first edge of the transformer circuitry and a fourth edge of the transformer circuitry of the transformer device opposing the third edge, respectively.

The transformer circuitry of the transformer device may include a marker provided to identify positions of the one or more first connectors and the one or more second connectors.

The one or more first connectors and the one or more second connectors may be provided to have different shapes to each other.

The transformer circuitry of the transformer device may include an input side coil applied with an input voltage and an output side coil isolated from the input side coil and outputting an output voltage corresponding to the input voltage which has been adjusted.

The one or more first connectors and the one or more second connectors may be provided to connect the input side coil of the transformer circuitry of the transformer device and an input side coil of the other transformer device with each other and connect the output side coil of the transformer circuitry of the transformer device and an output side coil of the other transformer device with each other in serial or parallel.

The cable may include a first cable and a pair of second cables, where the first cable connects the input side coil of the transformer circuitry of the transformer device and an input side coil of the other transformer device in serial through a connector of the one or more first connectors while the output side coil of the transformer circuitry of the transformer device is not connected to an output side coil of the other transformer device in serial, and the pair of second cables connect the output side coil of the transformer circuitry of the transformer device and the output side coil of the other transformer device in parallel via a circuit board.

An electronic device according to an embodiment of the disclosure includes a power supply having a plurality of transformer devices to supply a voltage, each of the plurality of transformer devices including transformer circuitry having a shape arranged to be connected to another transformer device among the plurality of transformer devices, and a connector provided on a side of the transformer circuitry so that the transformer circuitry is connected to a cable connected with the other transformer device, where the transformer circuitry and a transformer circuitry of the other transformer device are connected with each other through the cable to increase a voltage or current provided to a load.

The cable may include a flexible cable.

The plurality of transformer devices may include a first transformer device, and a second transformer device, and a transformer circuitry of the first transformer device and a transformer circuitry of the second transformer device are connected with each other in serial to increase the voltage provided to the load.

The plurality of transformer devices may include a first transformer device, and a second transformer device, and a transformer circuitry of the first transformer device and a transformer circuitry of the second transformer device are connected in parallel to increase the current provided to the load.

The connector may be provided to be plural to form a plurality of connectors, and the plurality of connectors may include one or more first connectors provided to connect the transformer circuitry and the transformer circuitry of the other transformer device in serial, and one or more second connectors provided to connect the transformer circuitry and the transformer circuitry of the other transformer device in parallel.

The one or more first connectors may include a pair of first connectors provided on a first edge of the transformer circuitry of the transformer device and a second edge of the transformer circuitry opposing the first edge, respectively.

The one or more second connectors may include a pair of first connectors provided on a third edge of the transformer circuitry of the transformer device perpendicular to the first edge of the transformer circuitry of the transformer device and a fourth edge of the transformer circuitry of the transformer device opposing the third edge, respectively.

The transformer circuitry of the transformer device may include a marker provided to identify positions of the one or more first connectors and the one or more second connectors.

DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
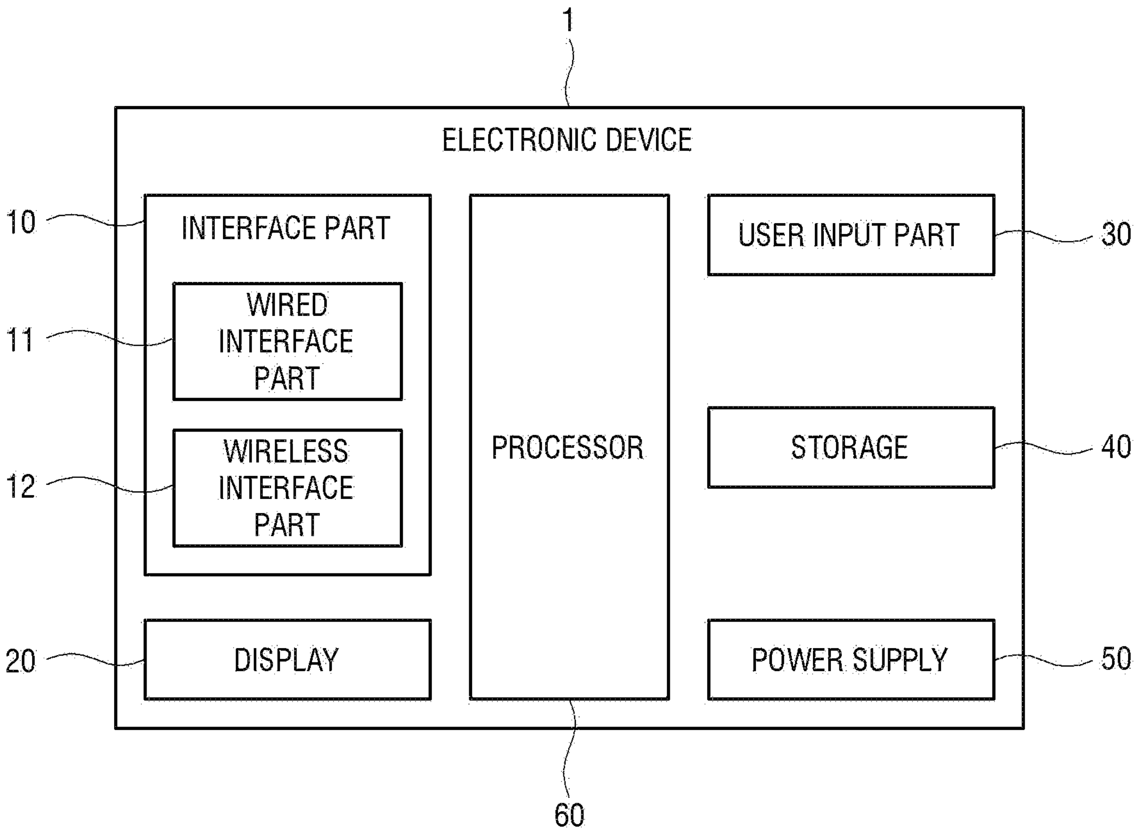
FIG. 1 illustrates a configuration block diagram of an electronic device.

FIG. 1 illustrates a configuration block diagram of an electronic device according to an embodiment.

As illustrated in FIG. 1, the electronic device 1 is embodied as, for example, a display device. However, the embodiment is merely one among various exemplary embodiments of the electronic device 1. There are no limits to the kinds of the electronic device 1. The electronic device 1 may include, for example, a stationary display device such as a television, a monitor, a digital signage, a digital whiteboard, an electronic frame, etc., an image processing device such as a set-top box, an optical media player, etc., an information processing device such as a computer, a mobile device such as a smartphone, a tablet computer, etc., a wearable device, or various kinds of devices such as a household appliance including a refrigerator, a washing machine, an air conditioner, a dishwasher, etc.

The electronic device 1 may include an interface part 10, a display 20, a user input part 30, a storage 40, a power supply 50 and a processor 60. The interface part 10 includes an interface circuitry through which the electronic device 1 performs communication with various kinds of devices such as an external device and a server and transmits and receives data. The interface part 10 may include one or more wired interface part 11 for wired communication connection and one or more wireless interface part 12 for wireless communication connection according to a connection method.

The wired interface part 11 includes a connector or port to which a cable of a predefined transmission standard is connected. For example, the wired interface part 11 includes a port which is connected with a terrestrial or satellite broadcasting antenna to receive a broadcast signal or with a cable for cable broadcasting. Further, the wired interface part 11 includes ports which are connected with cables of various wired transmission standards such as high definition multimedia interface (HDMI), DisplayPort (DP), digital video interactive (DVI), component, composite, S-video, thunderbolt, etc. to connect with various image processing apparatuses. Further, the wired interface part 11 includes a port of a universal serial bus (USB) standard to connect with a USB device. Further, the wired interface part 11 includes an optical port to which an optical cable is connected. Further, the wired interface part 11 includes an audio input port to which an external microphone is connected, and an audio output port to which a headset, an earphone, an external speaker, etc. is connected. Further, the wired interface part 11 includes an Ethernet port which is connected to a gateway, a router, a hub, etc. for connection with a wide area network.

The wireless interface part 12 includes an interactive communication circuitry which includes at least one of elements such as a communication module, a communication chip, etc. corresponding to various kinds of wireless communication protocols. For example, the wireless interface part 12 includes a Wi-Fi communication chip for wireless communication with an access point based on Wi-Fi, a communication chip for wireless communication such as Bluetooth, Zigbee, Z-Wave, WirelessHD, wireless gigabits (WiGig), near field communication (NFC), etc., an infrared (IR) module for IR communication, a mobile communication chip for mobile communication with a mobile device, etc.

The display 20 includes a display panel capable of displaying an image on a screen. The display panel may have a light reception structure such as a liquid crystal display (LCD) type, or a spontaneous emission structure such as an organic light emitting diode (OLED) type. The display 20 may include an additional element according to the structure of the display panel. For example, in the case of the display panel being of the LCD type, the display 20 includes an LCD panel, a backlight unit for supplying light, and a panel driving substrate for driving liquid crystal of the LCD panel.

The user input part 30 includes a circuitry related to various kinds of input interfaces which are provided to be manipulated by a user to receive a user input. The user input part 30 may be variously configured according to the kind of the electronic device 1, and there may be, for example, a mechanical or electronic button part of the electronic device 1, a touch pad, a sensor, a camera, a touch screen, a remote controller separated from a main body of the electronic device 1, etc.

The storage 40 stores digitalized data. The storage 40 includes a nonvolatile storage which is capable of retaining data regardless of whether power is supplied or not, and a volatile memory which loads data to be processed by the processor 60 and is not allowed to retain the data unless power is supplied. As the storage, there are a flash memory, a hard disc drive (HDD), a solid-state drive (SSD), a read only memory (ROM), etc., and, as the memory, there are a buffer, a random-access memory (RAM), etc.

The power supply 50 adjusts a power characteristic of external power which is input and transfers the power to the elements. For example, the power supply 50 converts alternating power which is input from an external power source into direct power and outputs the power which has been adjusted to have a current or voltage that fits to each element of the electronic device 1. To do this, the power supply 50 may include a switched-mode power supply. Also, the power supply 50 according to the embodiment includes a plurality of transformers which are modularized and the transformers will be described later.

The processor 60 includes one or more hardware processors which are embodied as a central processing unit (CPU), a chipset, a buffer, circuitry, etc. that are mounted on a printed circuit board (PCB). The processor 60 may be embodied as a system on chip (SoC) according to a design method. In a case of the electronic device 1 being embodied as a display device, the processor 60 includes modules which correspond to various processes such as a demultiplexer, a decoder, a scaler, an audio digital signal processor (DSP), an amplifier, etc. Here, a part or all of such modules may be embodied as the SoC. For example, a module related to an image process such as a demultiplexer, a decoder, a scaler, etc. may be embodied as an image processing SoC, and an audio DSP may be embodied as a chipset separated from the SoC.

Hereafter, the structure of the transformer which is applied to the power supply 50 of the electronic device 1 will be described.

Figure 2:
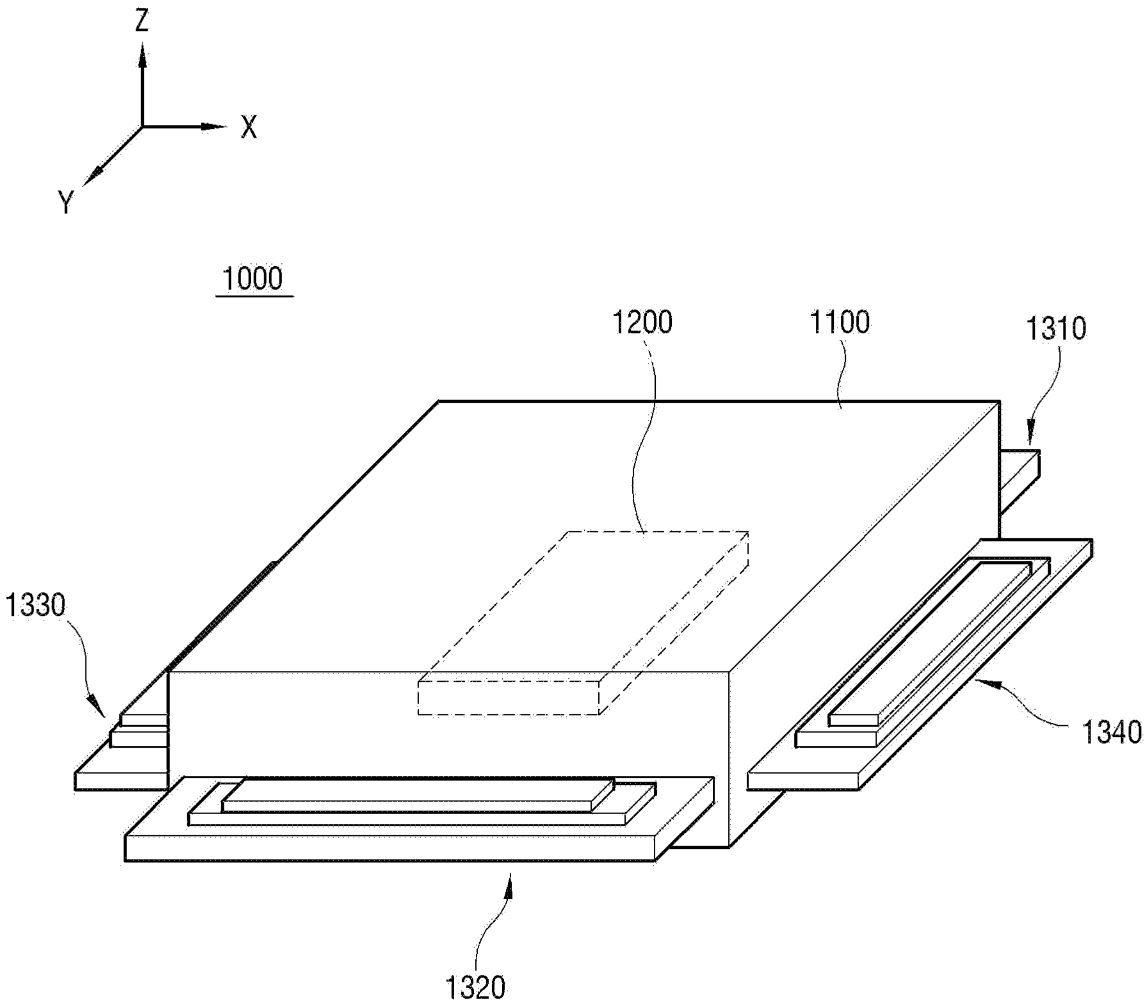
FIG. 2 illustrates a perspective view of one of plurality of transformer devices which are modularized.

FIG. 2 illustrates a perspective view of one of plurality of transformer devices which are modularized.

As illustrated in FIG. 2, a transformer device 1000 includes a device body 1100. The device body 1100 includes a transformer circuitry 1200, described later, in a housing having an outer shape of hexahedron. In this embodiment, the device body 1100 has a square flat surface where a length of an X direction edge and a length of a Y direction edge of the device body 1100 are substantially the same. However, such structure may be varied in accordance to a design method, and the length of the X direction edge and the length of the Y direction edge of the device body 1100 may be different from each other. That is, in accordance to a design method, the device body 1100 may have a flat surface parallel to an X-Y plane which is a square or rectangular shape.

The transformer circuitry 1200 adjusts and outputs an alternating voltage which is applied. The transformer circuitry 1200 has a structure where a pair of coils that are isolated from each other are wound around a core, which will be described in detail later.

The transformer device 1000 includes connectors 1310, 1320, 1330 and 1340 which are respectively provided at four directional edges of the device body 1100, specifically, on side walls of the four directional edges which erect along a Z direction. The transformer device 1000 of the embodiment includes a first connector 1310 which is provided at a −Y directional edge of the device body 1100, a second connector 1320 which is provided at a Y directional edge of the device body 1100, a third connector 1330 which is provided at a −X directional edge of the device body 1100 and a fourth connector 1340 which is provided at an X directional edge of the device body 1100. That is, a plane figure of the transformer device 1000 has a shape in which the four connectors 1310, 1320, 1330 and 1340 extend from the four directional edges towards surroundings of the device body 1100.

A specific structure of the connectors 1310, 1320, 1330 and 1340 may be variously provided in accordance with a design method. As an example of the connectors 1310, 1320, 1330 and 1340, the connectors 1310, 1320, 1330 and 1340 include PCBs which are electrically connected to the transformer circuitry 1200 in the device body 1100. The PCBs are printed with one or more wirings through which power from the transformer circuitry 1200 is output or power from outside is applied to the transformer circuitry 1200.

In the electronic device, a plurality of transformer devices 1000 are used together. The transformer circuitry 1200 provided in each of the plurality of transformer devices 1000 is electrically connected with each other through the connectors 1310, 1320, 1330 and 1340 provided in the transformer devices 1000. With an interconnection between the plurality of transformer devices 1000, a high output voltage or current is achieved.

Hereinafter, a method of interconnecting the plurality of transformer devices 1000 will be described.

Figure 3:
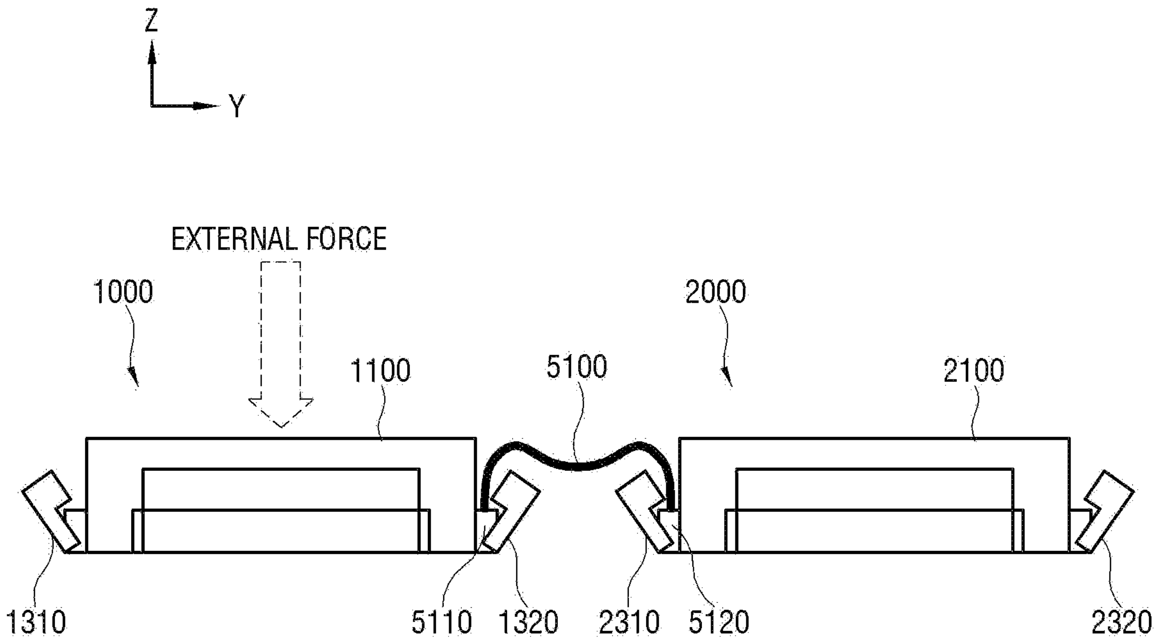
FIG. 3 is a side view illustrating that a pair of transformer devices are interconnected.

FIG. 3 is a side view illustrating that a pair of transformer devices are interconnected.

As illustrated in FIG. 3, a first transformer device 1000 has a first device body 1100 and a plurality of connectors 1310 and 1320. A second transformer device 2000 which has substantially the same structure as the first transformer device 1000 has a second device body 2100 and a plurality of connectors 2310 and 2320. The first transformer device 1000 and the second transformer device 2000 are electrically connected with each other by a cable 5100.

A first end 5110 of the cable 5100 is coupled to a connector 1320 of the first transformer device 1000 while a second end 5120 of the cable 5100 is coupled to a connector 2310 of the second transformer device 2000. The cable 5100 may be applied with various structures within a range where electrical connection is possible and, in this embodiment, is provided as a flexible cable.

The connectors 1310 and 1320 of the first transformer device 1000 may be applied with an additional configuration for more stable coupling of the cable 5100. For example, the connectors 1310 and 1320 may further have covers which rotate to cover the first end 5110 of the cable 5100, while the first end 5110 of the cable 5100 is coupled with the connectors 1310 and 1320, so that the cable 5100 cannot be removed from the connectors 1310 and 1320. Alternatively, the connectors 1310 and 1320 themselves may be provided to rotate with the first device body 1100. In this case, the connectors 1310 and 1320 rotate to open from the first device body 1100 to be easily coupled with the first end 5110 of the cable 5100 and be close to the first device body 1100 after being coupled with the first end 5110 of the cable 5100. The cover locks the cable 5100 which is coupled with the connectors 1310 and 1320 to prevent the cable 5100 from being removed. For example, as the first end 5110 of the cable 5100 is coupled with the connector 1320 and the cover rotates to be close to the first device body 1100, the cable 5100 is locked so as not to be removed from the connector 1320. On the other hand, as the cover rotates to open from the first device body 1100, the first end 5110 of the cable 5100 can be easily removed from the connector 1320 by an external force.

Because the flexible cable 5100 is applied with a structure to connect with the first transformer device 1000 and the second transformer device 2000, it is possible to enhance the strength of the transformer against an external pressure while realizing slimness of the electronic device. For example, although an external force is applied to the first transformer device 1000 in a −Z direction so that the first transformer device 1000 is moved by a distance in the −Z direction, the second transformer device 2000 is allowed not to be moved from an original position because of the cable 5100. That is, because the transformers which are applied to the electronic device where the transformers are modularized as the plurality of transformer devices 1000 and 2000 are interconnected with the flexible cable 5100, the transformers can be changed in shape more flexibly against an external force. According to the embodiment, when the transformer is embodied as a slim structure corresponding to a slim electronic device, it is possible to increase the strength against the external force applied in a thickness direction and prevent a crack.

Meanwhile, the flexible cable 5100 is applied so that the structure of the transformer according to the embodiment is also applied to an electronic device which is embodied to be flexible to be bend. Hereinafter, such embodiments will be described.

Figure 4:
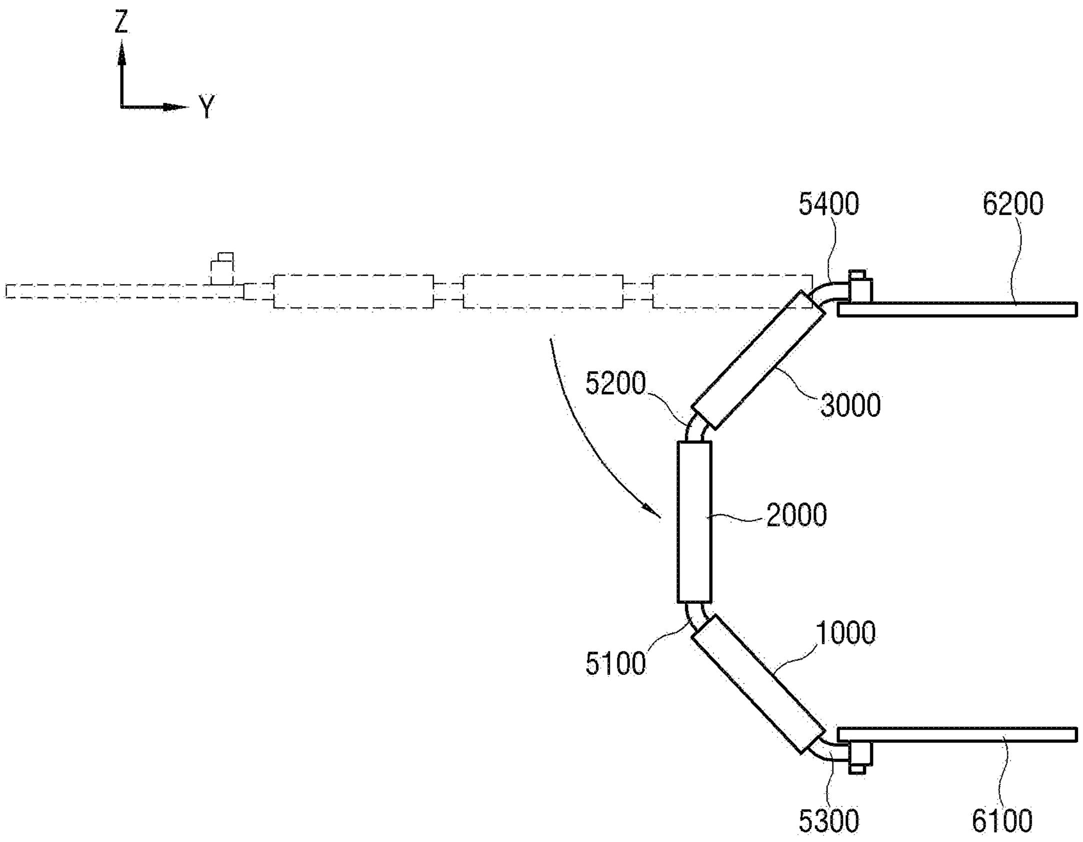
FIG. 4 is a side view illustrating that a plurality of transformer devices which are connected with a cable are bent.

FIG. 4 is a side view illustrating that a plurality of transformer devices which are connected with a cable are bent.

As illustrated in FIG. 4, a first transformer device 1000, a second transformer device 2000 and a third transformer device 3000 are sequentially arranged in a Y direction. A cable 5100 is connected between the first transformer device 1000 and the second transformer device 2000 and a cable 5200 is connected between the second transformer device 2000 and the third transformer device 3000, respectively. At least one of the first transformer device 1000, the second transformer device 2000 and the third transformer device 3000 may be connected to additional circuit boards 6100 and 6200. A cable 5300 is connected between the first transformer device 1000 and the first circuit board 6100 and a cable 5400 is connected between the third transformer device 3000 and the second circuit board 6200, respectively.

This structure may extend in parallel along the Y direction or, when the structure is applied with an external force, the structure be bent overall by the flexible cables 5100, 5200, 5300 and 5400. That is, the cables 5100, 5200, 5300 and 5400 may not only prevent a crack from occurring by an external force which happens in an area but also be bent so as to be applied to a flexible electronic device.

Hereinafter, a structure in which a plurality of transformer devices are interconnected will be described.

Figure 5:
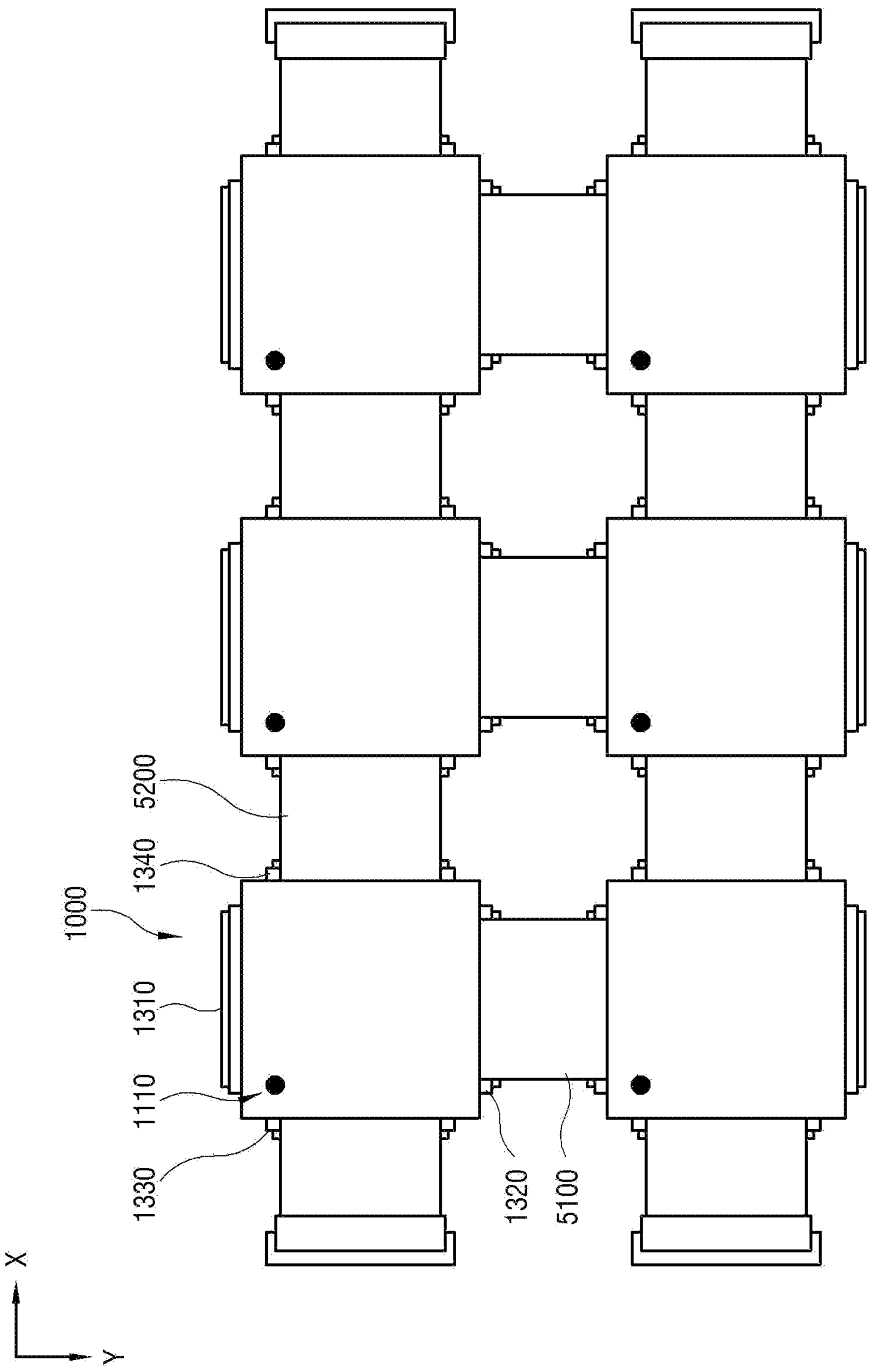
FIG. 5 is a plan view illustrating a plurality of transformer devices which is interconnected in a matrix shape.

FIG. 5 is a plan view illustrating a plurality of transformer devices which are interconnected in a matrix shape.

As illustrated in FIG. 5, the plurality of transformer devices 1000 may be interconnected by using cables 5100 and 5200 in the X direction or the Y direction perpendicular to the X direction on an X-Y plane. Because each transformer device 1000 has a surface of quadrangle (square or rectangle), an overall shape of the plurality of transformer devices 1000 interconnected by the cables 5100 and 5200 is a matrix shape.

As described above, the plurality of transformer devices 1000 are interconnected electrically so as to change a characteristic of an applied voltage and output the voltage to a load. For this, the plurality of transformer devices 1000 may be connected through the cables 5100 and 5200 with a PCB which is connected to the load.

Here, the plurality of transformer devices 1000 have a different characteristic of a voltage which is output to the load according to a direction in which the plurality of transformer devices 1000 are interconnected. For example, it is supposed in this figure that there are a first edge and a second edge which face each other in the Y direction of the transformer device 1000 and a third edge and a fourth edge which face each other in the X direction of the transformer device 1000. The first edge or the second edge of one transformer device 1000 is connected with the first edge or the second edge of another transformer device 1000 so as to be a serial connection. On the other hand, the third edge or the fourth edge of one transformer device 1000 is connected with the third edge or the fourth edge of another transformer device 1000 so as to be a parallel connection. Also, such connection methods are optional matters of design change and may be replaced with a case where the serial connection and the parallel connection are opposite.

Because it is necessary to identify an orientation of the transformer device 1000 in order to distinguish the serial connection and the parallel connection, there may be provided a marker 1110 at a side of the transformer device 1000 to guide the orientation of the transformer device 1000 to be identified. The marker 1110 may be provided in various forms such as a graphic design, an icon, a message, etc. Cases are differentiated between the serial connection and the parallel connection according to the orientation of the one transformer device 1000 connected with the other transformer device 1000. The marker 1110 is provided for a user to easily distinguish between the orientation of the transformer device 1000 for the serial connection and the orientation of the transformer device 1000 for the parallel connection.

Alternatively, the marker 1110 may be embodied as an image which is placed to be biased to a side on a surface of the transformer device 1000 so as to easily identify the orientation of the transformer device 1000. For example, the marker 1110 may include an image which is provided at a position close to a vertex between the first edge and the third edge of the transformer device 1000. By using the marker 1110, it is possible for a user to easily identify the orientation according to the direction of the plurality of transformer devices 1000.

Alternatively, among the four direction connectors 1310, 1320, 1330 and 1340 of the transformer device 1000 to which the cables 5100 and 5200 are coupled, the first connector 1310 and the second connector 1320 which correspond to the serial connection and the third connector 1330 and the fourth connector 1340 which correspond to the parallel connection have different coupling shapes from each other. In this case, the cable 5100 may be coupled to the first connector 1310 or the second connector 1320 but not be coupled to the third connector 1330 or the fourth connector 1340. On the other hand, the cable 5200 may be coupled to the third connector 1330 or the fourth connector 1340 but not be coupled to the first connector 1310 or the second connector 1320. According to this structure, it is possible to prevent a wrong connection among the plurality of transformer devices 1000 in advance. However, such structure is merely an example of the design methods, the plurality of connectors 1310, 1320, 1330 and 1340 may all have a same coupling shape.

Hereinafter, circuitry and a wiring structure in the transformer device 1000 will be described.

Figure 6:
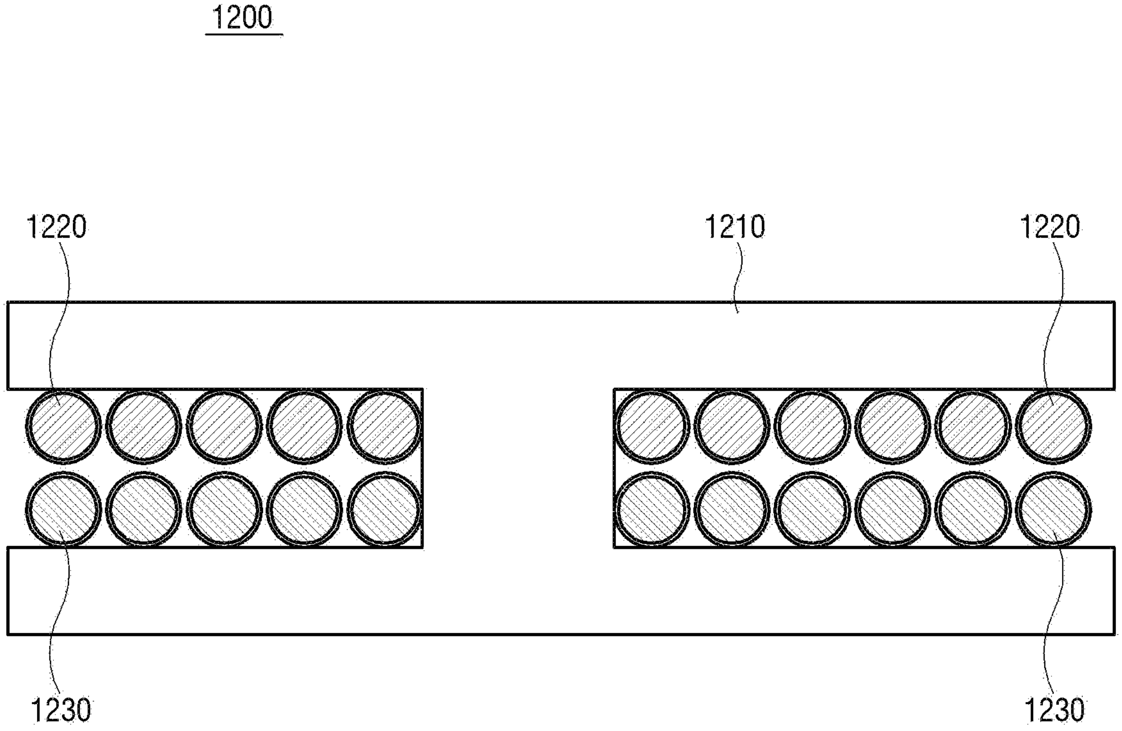
FIG. 6 is a side sectional view of transformer circuitry in the transformer device.

FIG. 6 is a side sectional view of a transformer circuitry in the transformer device.

As illustrated in FIG. 6, a transformer circuitry 1200 in a device body includes a core 1210. Also, the transformer circuitry 1200 includes an input side coil 1220 which is wound at the core 1210 and an output side coil 1230 which is wound at the core 1210 and is isolated from the input side coil 1220. When the input side coil 1220 is applied with an input voltage, an output voltage into which the input voltage is adjusted is output from the output side coil 1230 by the electromagnetic induction.

The core 1210 includes, for example, ferrite or steel material. The core 1210 performs a role of a bobbin around which the input side coil 1220 and the output side coil 1230 are wound, respectively, while allowing a magnetic flux by the electromagnetic induction to move actively so as to contribute to activation of a magnetic field.

In an ideal case of not considering a loss, a voltage of the transformer circuitry 1200 conforms to a ratio of the number of turns of the input side coil 1220 and the number of turns of the output side coil 1230. For example, if the output voltage is to be lowered to ½ of the input voltage, the number of turns of the output side coil 1230 is to be ½ of the number of turns of the input side coil 1220. However, in a process where a voltage is transferred from the input side coil 1220 to the output side coil 1230, there occur a loss due to an induced current of a whirlpool shape in the core 1210 by a change in the magnetic flux and a loss due to resistances of the input side coil 1220 and the output side coil 1230 themselves. Because of these loses, a substantial level of the output voltage is slightly different from an ideal case. Accordingly, the number of turns are determined in consideration of such point.

Figure 7:
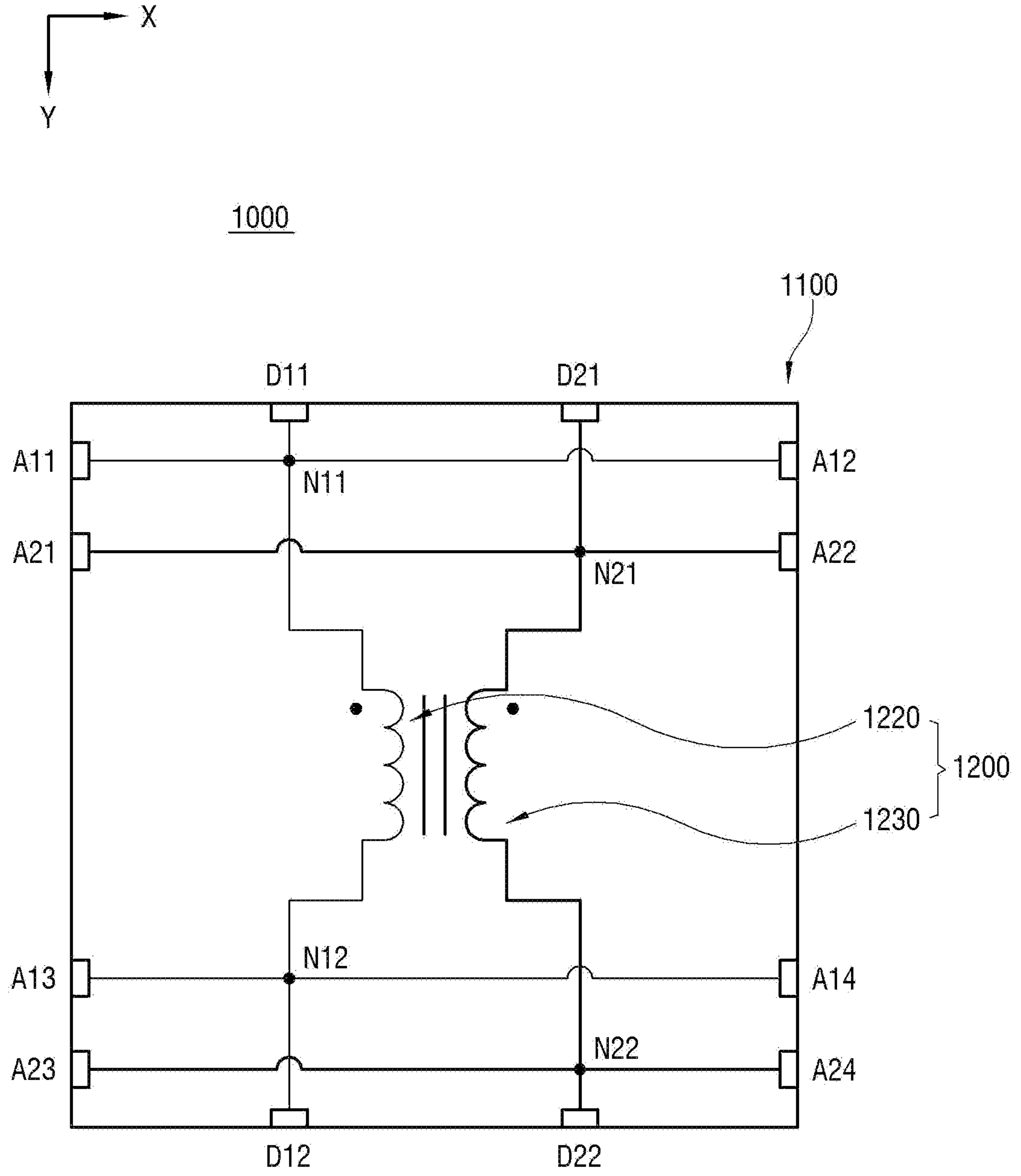
FIG. 7 illustrates transformer circuitry and a terminal structure in the transformer device.

FIG. 7 illustrates a transformer circuitry and a terminal structure in the transformer device.

As illustrated in FIG. 7, the transformer circuitry 1200 is provided in a device body 1100 of the transformer device 1000. The transformer circuitry 1200 includes the input side coil 1220 which is applied with an input voltage and forms a magnetic field and the output side coil 1230 which generates and outputs an output voltage by the formed magnetic field. A plurality of terminals are provided at four direction edges of the device body 1100, where the terminals are electrically connected with the input side coil 1220 and the output side coil 1230 as well as with the connectors 1310, 1320, 1330 and 1340 (see FIG. 2).

Among the terminals, a terminal D11, a terminal D12, a terminal A11, a terminal A12, a terminal A13 and a terminal A14 are terminals connected with the input side coil 1220. Meanwhile, a terminal D21, a terminal D22, a terminal A21, a terminal A22, a terminal A23 and a terminal A24 are terminals connected with the output side coil 1230. The terminals connected with the input side coil 1220 and the terminals connected with the output side coil 1230 are isolated from each other.

Also, among the terminals, the terminal D11, the terminal D12, the terminal D21 and the terminal D22 are terminals related to the serial connection. Meanwhile, the terminal A11, the terminal A12, the terminal A13, the terminal A14, the terminal A21, the terminal A22, the terminal A23 and the terminal A24 are terminals related to the parallel connection.

Also, among the terminals, the terminal D11 and the terminal D21 are provided on a first edge of the device body 1100, for example, on a side in the −Y direction. The terminal D12 and the terminal D22 are provided on a second edge of the device body 1100, for example, on a side in the Y direction. The terminal A11, the terminal A13, the terminal A21 and the terminal A23 are provided on a third edge of the device body 1100, for example, on a side in the −X direction. The terminal A12, the terminal A14, the terminal A22 and the terminal A24 are provided on a fourth edge of the device body 1100, for example, on a side in the X direction.

The terminal D11 is connected to a node N11 which is a node connected with one end part of the input side coil 1220. The terminal D12 is connected to a node N12 which is a node connected with another end part of the input side coil 1220. The terminal A11 and the terminal A12 are connected to the node N11. The terminal A13 and the terminal A14 are connected to the node N12. That is, the terminal A11 and the terminal A12 are diverged from the node N11, and the terminal A13 and the terminal A14 are diverged from the node N12.

The terminal D21 is connected to a node N21 which is a node connected with one end part of the output side coil 1230. The terminal D22 is connected to a node N22 which is a node connected with another end part of the output side coil 1230. The terminal A21 and the terminal A22 are connected to the node N21. The terminal A23 and the terminal A24 are connected to the node N22. That is, the terminal A21 and the terminal A22 are diverged from the node N21, and the terminal A23 and the terminal A24 are diverged from the node N22.

The transformer device 1000 which has the transformer circuitry 1200 may be connected with one or more another transformer device 2000 (see FIG. 3) which has a same structure through the cable 5100 (see FIG. 3). Here, according to which terminals among the plurality of terminals of the transformer device 1000 and the plurality of terminals of the other transformer device 2000 (see FIG. 3) are interconnected by the cable 5100 (see FIG. 3), a characteristic of power which is finally output to the load.

Hereinafter, two connection methods between the transformer device 1000 and the other transformer device 2000 (see FIG. 3) will be described.

Figure 8:
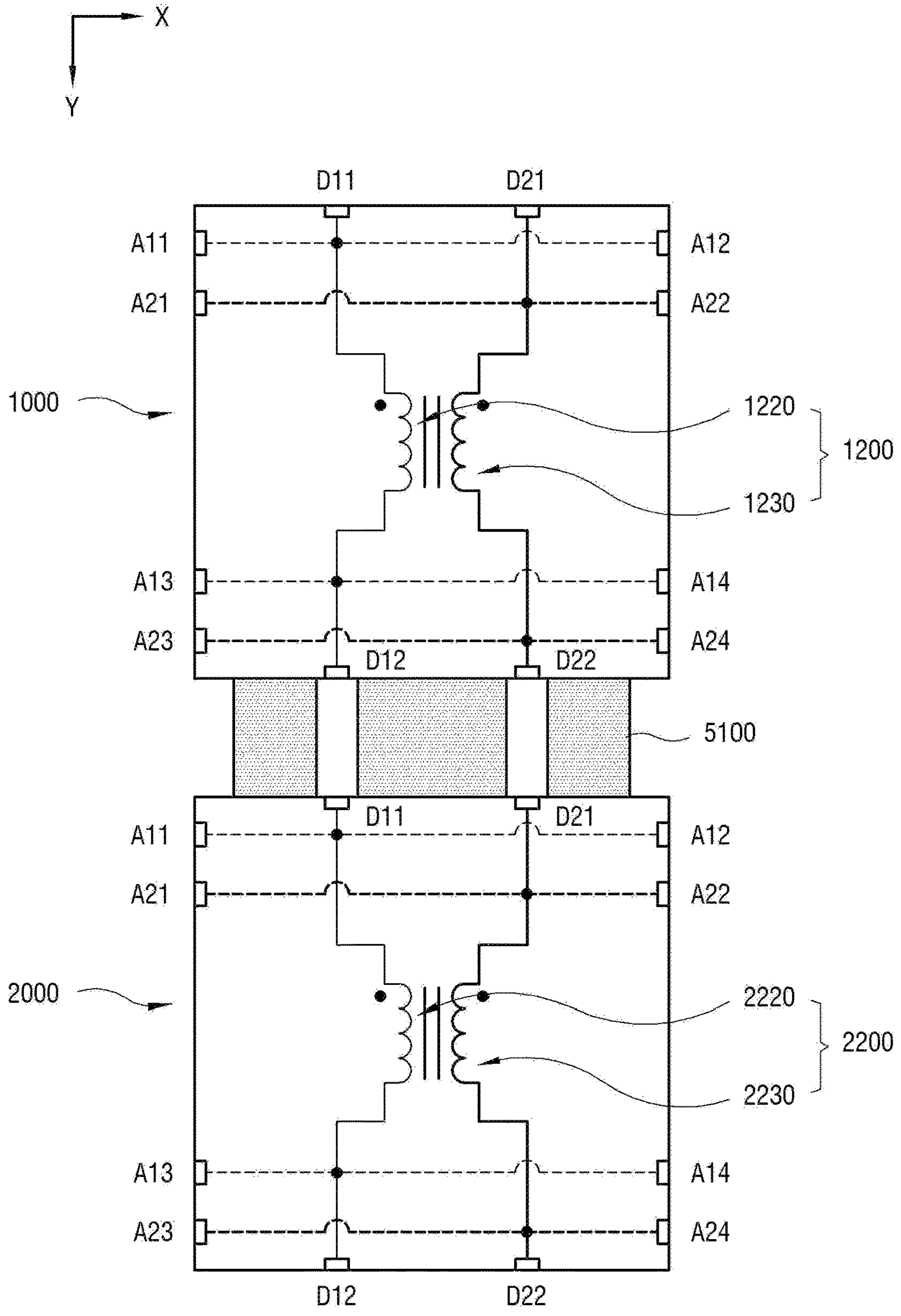
FIG. 8 illustrates an exemplary connection form in which the two transformer devices are connected in serial.

FIG. 8 illustrates an exemplary connection form in which the two transformer devices are connected in serial.

As illustrated in FIG. 8, a first transformer device 1000 and a second transformer device 2000 have a substantially same structure with each other. Because the plurality of transformer devices 1000 and 2000 having the same structure are connected and used, it is possible to universally correspond to an electronic device which has various power requirement characteristic. Also, the transformer devices 1000 and 2000 have a rectangular shape in order to facilitate connection by the cable 5100 and easily identify a function of a connected state. In this embodiment, the plurality of transformer devices 1000 and 2000 are connected in the Y direction, which indicates a case corresponding to a serial connection.

The cable 5100 connects the terminal D12 and the terminal D22 which are provided on the second edge of the first transformer device 1000 to the terminal D11 and the terminal D21 which are provided on the first edge of the second transformer device 2000, respectively. Accordingly, a first transformer circuitry 1200 of the first transformer device 1000 and a second transformer circuitry 2200 of the second transformer device 2000 are connected in serial. The input voltage is applied to the terminal D11 and the terminal D12 of the second transformer device 2000. The output voltage is output from the terminal D21 of the first transformer device 1000 and the terminal D22 of the second transformer device 2000.

More specifically, a first input side coil 1220 of the first transformer device 1000 and a second input side coil 2220 of the second transformer device 2000 are connected in serial via the terminal D12 of the first transformer device 1000, the cable 5100 and the terminal D11 of the second transformer device 2000. The first output side coil 1230 of the first transformer device 1000 and a second output side coil 2230 of the second transformer device 2000 are connected in serial via the terminal D22 of the first transformer device 1000, the cable 5100 and the terminal D21 of the second transformer device 2000.

As to a combination of the first transformer device 1000 and the second transformer device 2000, the number of turns of the input side coil which is applied with a voltage corresponds to a sum of the number of turns of the first input side coil 1220 and the number of turns of the second input side coil 2220. Also, the number of turns of the output side coil corresponds to a sum of the number of turns of the first output side coil 1230 and the number of turns of the second output side coil 2230. According to the embodiment, because the number of turns of the input side coil connected in serial and the number of turns of the output side coil connected in serial increase, the combination of the first transformer device 1000 and the second transformer device 2000 may correspond to a load which requires a high voltage.

Figure 9:
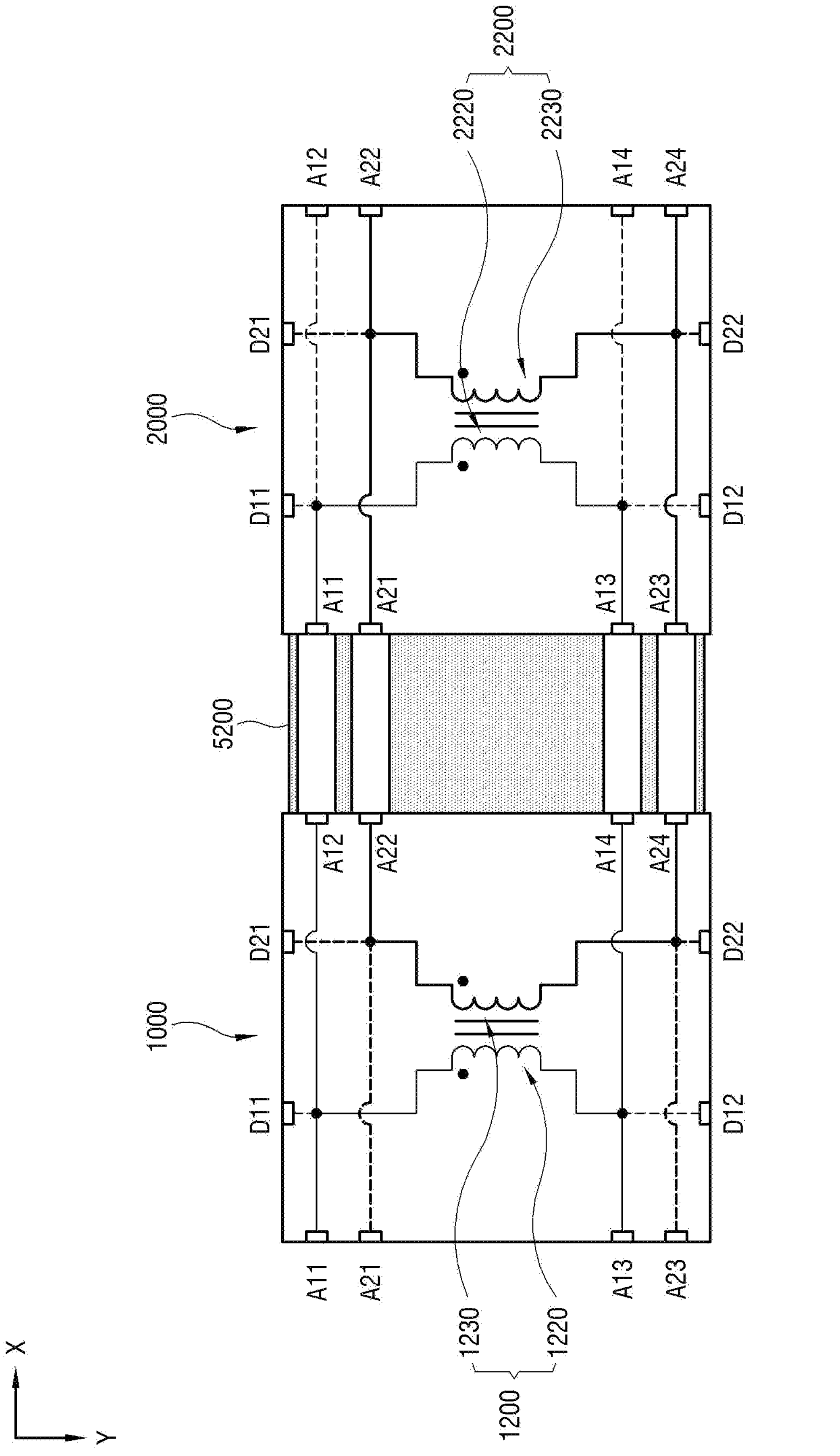
FIG. 9 illustrates an exemplary connection form in which the two transformer devices are connected in parallel.

FIG. 9 illustrates an exemplary connection form in which the two transformer devices are connected in parallel.

As illustrated in FIG. 9, in this embodiment, the plurality of transformer devices 1000 and 2000 are connected in the X direction, which indicates a case corresponding to a parallel connection.

The cable 5200 connects the terminal A12, the terminal A22, the terminal A14 and the terminal A24 provided on the fourth edge of the first transformer device 1000 with the terminal A11, the terminal A21, the terminal A13 and the terminal A23 provided on the third edge of the second transformer device 2000, respectively. Accordingly, the first transformer circuitry 1200 of the first transformer device 1000 and the second transformer circuitry 2200 of the second transformer device 2000 are connected in parallel. The input voltage is applied to the terminal A11 and the terminal A13 of the first transformer device 1000. The output voltage is output from the terminal A22 and the terminal A24 of the second transformer device 2000.

Specifically, one end part of the first input side coil 1220 of the first transformer device 1000 and one end part of the second input side coil 2220 of the second transformer device 2000 are connected in parallel via the terminal A12 of the first transformer device 1000, the cable 5200 and the terminal A11 of the second transformer device 2000. Another end part of the first input side coil 1220 of the first transformer device 1000 and another end part of the second input side coil 2220 of the second transformer device 2000 are connected in parallel via the terminal A14 of the first transformer device 1000, the cable 5200 and the terminal A13 of the second transformer device 2000.

One end part of the first output side coil 1230 of the first transformer device 1000 and one end part of the second output side coil 2230 of the second transformer device 2000 are connected in parallel via the terminal A22 of the first transformer device 1000, the cable 5200 and the terminal A21 of the second transformer device 2000. Another end part of the first output side coil 1230 of the first transformer device 1000 and another end part of the second output side coil 2230 of the second transformer device 2000 are connected in parallel via the terminal A24 of the first transformer device 1000, the cable 5200 and the terminal A23 of the second transformer device 2000.

Regarding the combination of the first transformer device 1000 and the second transformer device 2000, the number of connections of the input side coil and the output side coil in parallel with the load increases. Accordingly, by the structure of the embodiment, the combination of the first transformer device 1000 and the second transformer device 2000 is able to correspond to a load which requires a high current.

As described in the two embodiments, the connection combinations of the plurality of transformer devices 1000 and 2000 having a common structure are different so as to be applied appropriately to a case corresponding to a high voltage and a case corresponding to a high current, respectively. Although a case where the two transformer devices 1000 and 2000 are combined has been described in this embodiment, three or more transformer devices 1000 and 2000 may be connected in serial or parallel according to the characteristic of the corresponding voltage or current.

Meanwhile, in the above-described embodiments, it has been described that when the two transformer devices 1000 and 2000 are interconnected, the connection method between the two input side coils 1220 and 2220 and the connection method between the two output side coils 1230 and 2230 are to be same. That is, if the two input side coils 1220 and 2220 are connected in serial, the two output side coils 1230 and 2230 are also connected in serial, whereas if the two input side coils 1220 and 2220 are connected in parallel, the two output side coils 1230 and 2230 are also connected in parallel.

However, when the two transformer devices 1000 and 2000 are interconnected, according to a design method, the two input side coils 1220 and 2220 may be connected in serial while the two output side coils 1230 and 2230 are connected in parallel. Hereinafter, such embodiment will be described.

Figure 10:
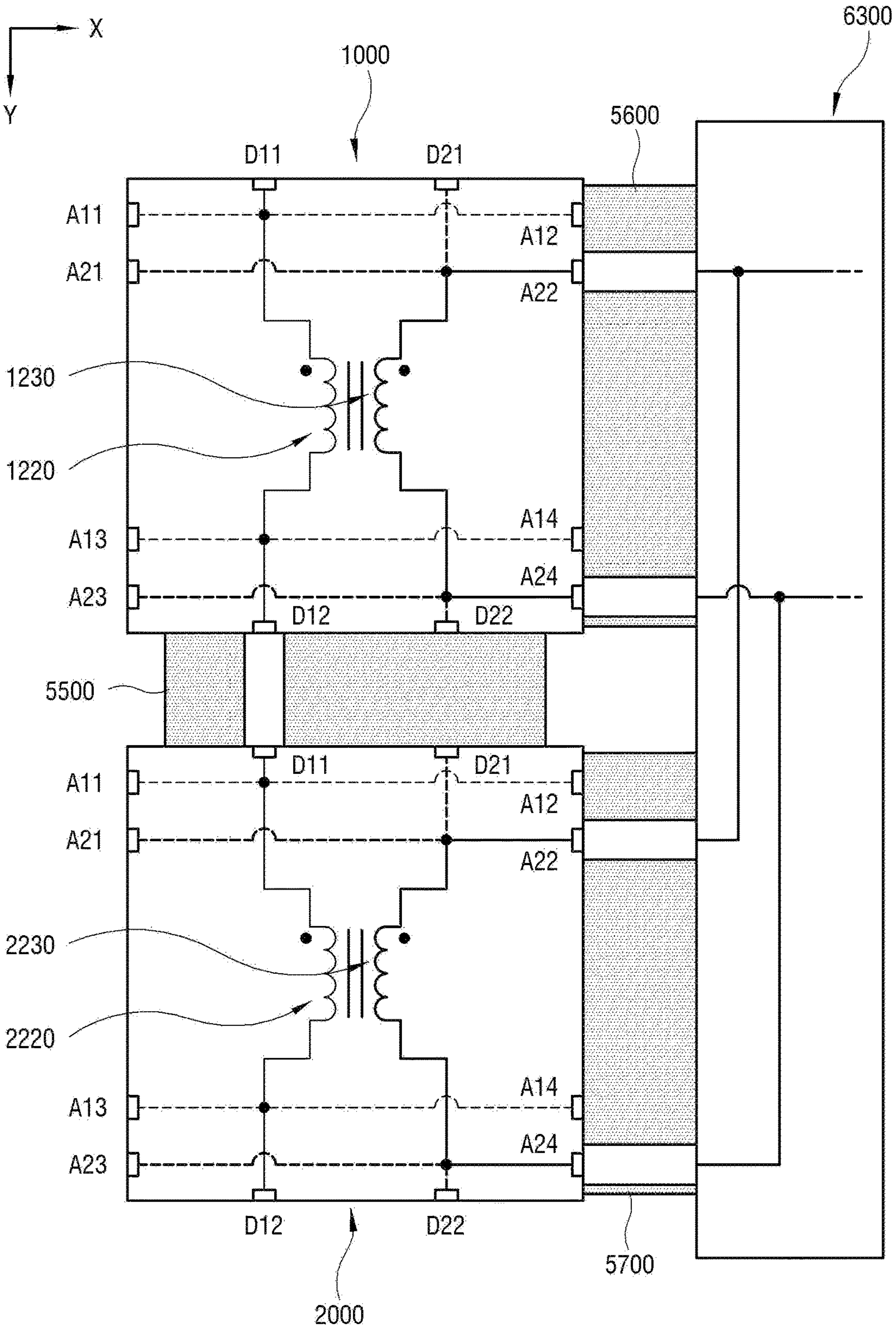
FIG. 10 illustrates an exemplary structure where when two transformer devices are connected, the input side coils are connected in serial while the output side coils are connected in parallel.

FIG. 10 illustrates an exemplary structure where when two transformer devices are connected, the input side coils are connected in serial while the output side coils are connected in parallel.

As illustrated in FIG. 10, when the first transformer device 1000 and the second transformer device 2000 are interconnected, there may be a structure through an additional PCB 6300 where two input side coils 1220 and 2220 are connected in serial while two output side coils 1230 and 2230 are connected in parallel. Such structure may be needed in a case where, for example, a high voltage is required in an input side of power while a high current is required in an output side of power.

The terminal D12 of the first transformer device 1000 and the terminal D11 of the second transformer device 2000 are connected by a first cable 5500. Accordingly, the first input side coil 1220 of the first transformer device 1000 and the second input side coil 2220 of the second transformer device 2000 are connected in serial so that the input side coils correspond to a high voltage. Meanwhile, the terminal D22 of the first transformer device 1000 and the terminal D21 of the second transformer device 2000 are not connected by the first cable 5500. Accordingly, the first output side coil 1230 of the first transformer device 1000 and the second output side coil 2230 of the second transformer device 2000 are not connected in serial by the first cable 5500.

The PCB 6300 further has a connector structure to couple a second cable 5600 and a third cable 5700.

The terminal A22 and the terminal A24 of the first transformer device 1000 are connected to the PCB 6300 by the second cable 5600. Meanwhile, the terminal A12 and the terminal A14 of the first transformer device 1000 are not connected to the PCB 6300 by the second cable 5600. Accordingly, the first output side coil 1230 is connected to the PCB 6300 through the second cable 5600, while the first input side coil 1220 is not connected to the PCB 6300 through the second cable 5600.

Also, the terminal A22 and the terminal A24 of the second transformer device 2000 are connected to the PCB 6300 by the third cable 5700. Meanwhile, the terminal A12 and the terminal A14 of the second transformer device 2000 are not connected to the PCB 6300 by the third cable 5700. Accordingly, the second output side coil 2230 is connected to the PCB 6300 through the third cable 5700, while the second input side coil 2220 is not connected to the PCB 6300 through the third cable 5700.

The PCB 6300 is provided to transfer to a load an output voltage which is output from the combination of the first transformer device 1000 and the second transformer device 2000. Here, the PCB 6300 connects the first output side coil 1230 of the first transformer device 1000 and the second output side coil 2230 of the second transformer device 2000 in parallel so that the output side coils correspond to a high current. Specifically, the PCB 6300 connects the terminal A22 which is connected to one end part of the first output side coil 1230 and the terminal A22 which is connected to one end part of the second output side coil 2230, while connecting the terminal A24 which is connected to another end part of the first output side coil 1230 and the terminal A24 which is connected to another end part of the second output side coil 2230.

That is, according to this embodiment, the first cable 5500 serially connects the first input side coil 1220 of the first transformer device 1000 and the second input side coil 2230 of the second transformer device 2000, while the wiring of the PCB 6300 connected to a load connects in parallel the first output side coil 1230 of the first transformer device 1000 and the second output side coil 2230 of the second transformer device 2000. By this configuration, in a case where a high voltage correspondence is required to the input side power while a high current correspondence is required to the output side power, the structure according to this embodiment can cope with the case.

Meanwhile, the transformer device according to the above-described embodiments has a structure to correspond to both cases of the serial connection and the parallel connection. That is, the transformer device is commonly used in the cases of the serial connection and the parallel connection and has a structure in which a connection method varies according to which connector to be connected to by the cable.

However, according to a design method, the transformer device may be provided as a structure which corresponds to only one of the serial connection and the parallel connection. Hereinafter, such embodiments will be described.

Figure 11:
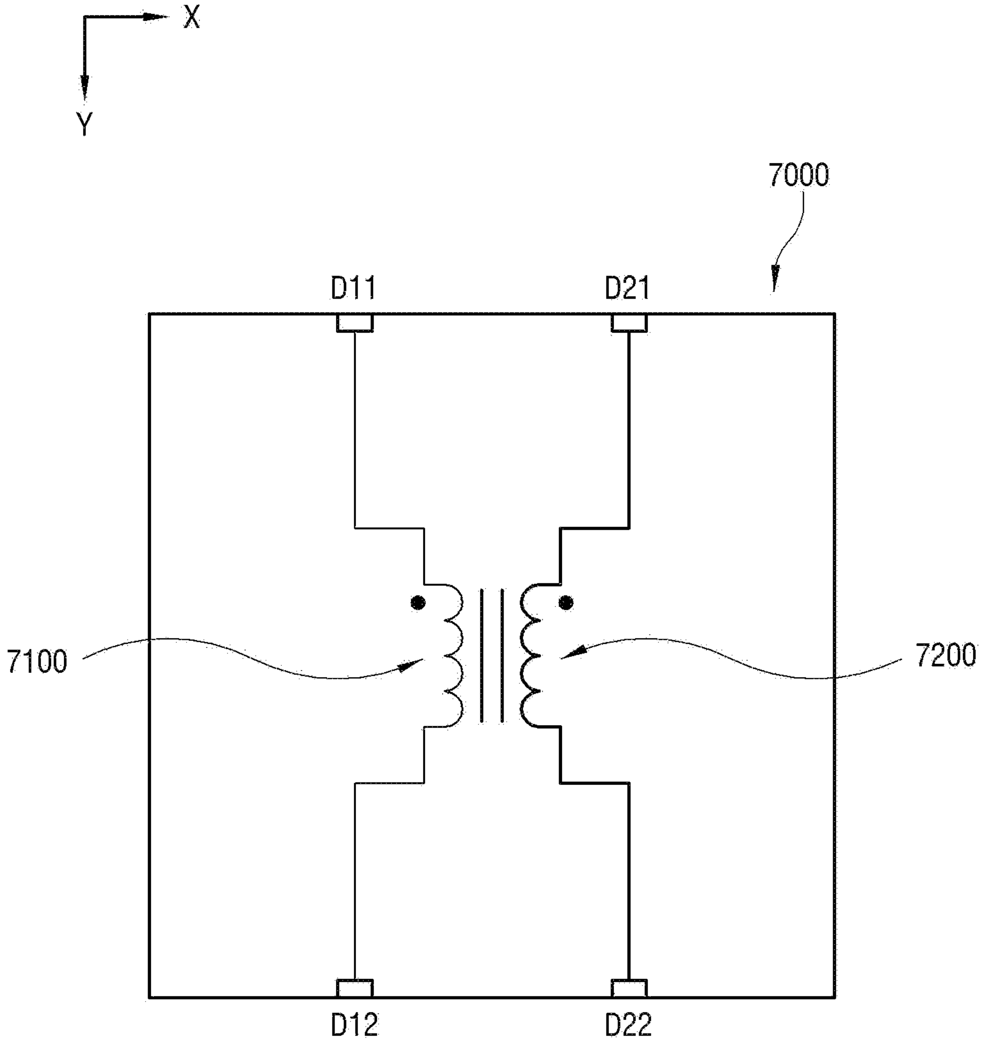
FIG. 11 illustrates exemplary inner circuitry of a transformer device which is provided to correspond to the serial connection.

FIG. 11 illustrates an exemplary inner circuitry of a transformer device which is provided to correspond to the serial connection.

As described in FIG. 11, the transformer device 7000 includes an input side coil 7100 and an output side coil 7200. On a first edge of the transformer device 7000, the terminal D11 which is connected to one end part of the input side coil 7100 and the terminal D21 which is connected to one end part of the output side coil 7200 are provided. On a second edge of the transformer device 7000, the terminal D12 which is connected to another end part of the input side coil 7100 and the terminal D22 which is connected to another end part of the output side coil 7200 are provided. Like this, the transformer device 7000 according to the embodiment includes a structure which corresponds to only the serial connection excluding the structure which corresponds to the parallel connection from the case of the above-described embodiment.

In a case of connecting the transformer device 7000 to another transformer device having a same structure, for example, by a cable, the terminal D12 of the transformer device 7000 is connected to the terminal D11 of the other transformer device while the terminal D22 of the transformer device 7000 is connected to the terminal D21 of the other transformer device. Because the serial connection of the plurality of transformer devices 7000 is described in the above-described embodiment, an additional description will be omitted in this embodiment.

Although this figure does not illustrate, the transformer device 7000 has a first connector which is provided on the first edge and is connected with the terminal D11 and the terminal D21 and a second connector which is provided on the second edge and is connected with the terminal D12 and the terminal D22. The first connector and the second connector allow the other transformer devices to be electrically connected by coupling of the flexible cable.

Figure 12:
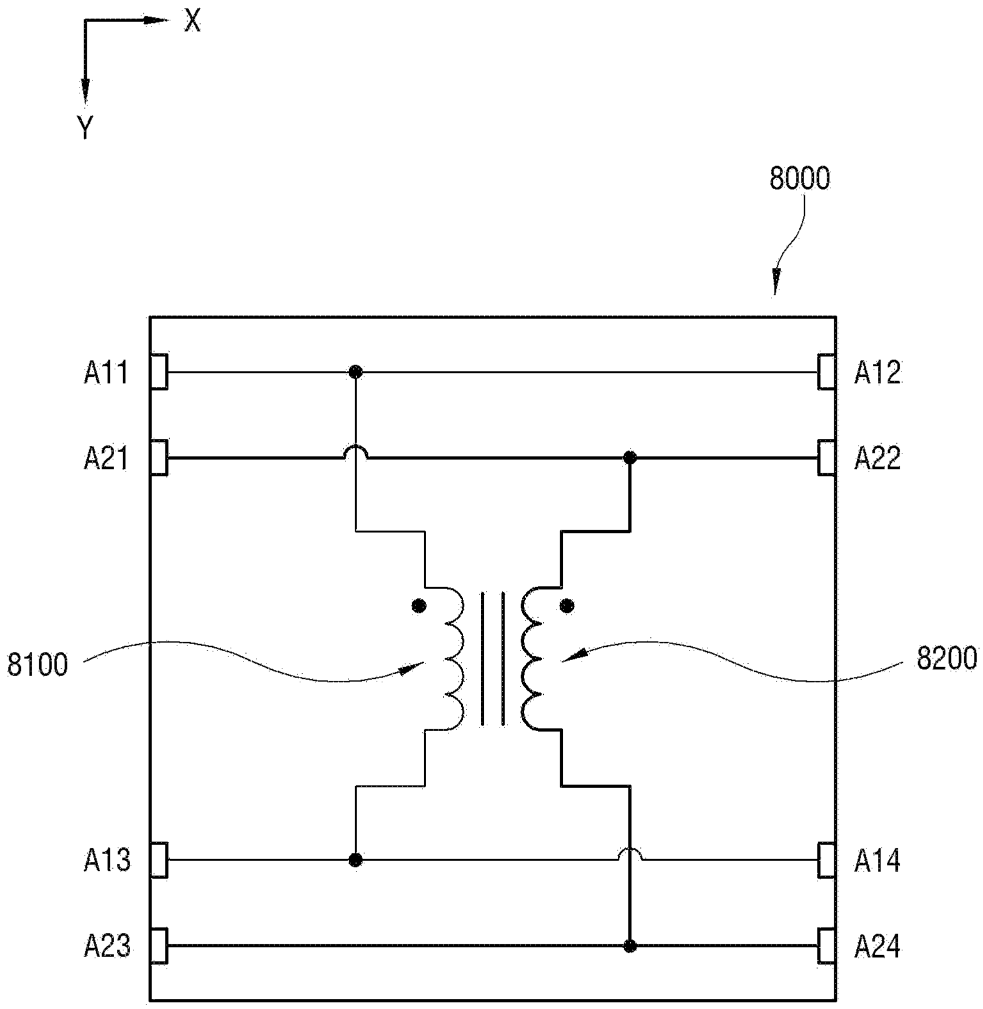
FIG. 12 illustrates exemplary inner circuitry of a transformer device which is provided to correspond to the parallel connection.

FIG. 12 illustrates an exemplary inner circuitry of a transformer device which is provided to correspond to the parallel connection.

As described in FIG. 12, the transformer device 8000 includes an input side coil 8100 and an output side coil 8200. On a third edge of the transformer device 8000, the terminal A11 which is connected to one end part of the input side coil 8100, the terminal A13 which is connected to another end part of the input side coil 8100, the terminal A21 which is connected to one end part of the output side coil 8200 and the terminal A23 which is connected to another end part of the output side coil 8200 are provided. Meanwhile, on a fourth edge of the transformer device 8000, the terminal A12 which is connected to the one end part of the input side coil 8100, the terminal A14 which is connected to the other end part of the input side coil 8100, the terminal A22 which is connected to the one end part of the output side coil 8200 and the terminal A24 which is connected to the other end part of the output side coil 8200 are provided. The transformer device 8000 according to the embodiment includes a structure which corresponds to only the parallel connection excluding the structure which corresponds to the serial connection from the case of the above-described embodiment.

In a case of connecting the transformer device 8000 to another transformer device having a same structure, for example, by a cable, the terminal A12 of the transformer device 8000 is connected to the terminal A11 of the other transformer device, the terminal A14 of the transformer device 8000 is connected to the terminal A13 of the other transformer device, the terminal A22 of the transformer device 8000 is connected to the terminal A21 of the other transformer device and the terminal A24 of the transformer device 8000 is connected to the terminal A23 of the other transformer device. Because the parallel connection of the plurality of transformer devices 8000 is described in the above-described embodiment, an additional description will be omitted in this embodiment.

Although this figure does not illustrate, the transformer device 8000 has a first connector which is provided on the third edge and is connected with the terminal A11, the terminal A21, the terminal A13 and the terminal A23 and a second connector which is provided on the fourth edge and is connected with the terminal A12, the terminal A22, the terminal A14 and the terminal A24. The first connector and the second connector allow the other transformer devices to be electrically connected by coupling of the flexible cable.

Meanwhile, in the above-described embodiment, a case where the transformer device is connected to another transformer device or a PCB through the cable has been described. However, because a structure where the transformer device is connected to another transformer device without using the cable is possible, hereinafter, such embodiments will be described.

Figure 13:
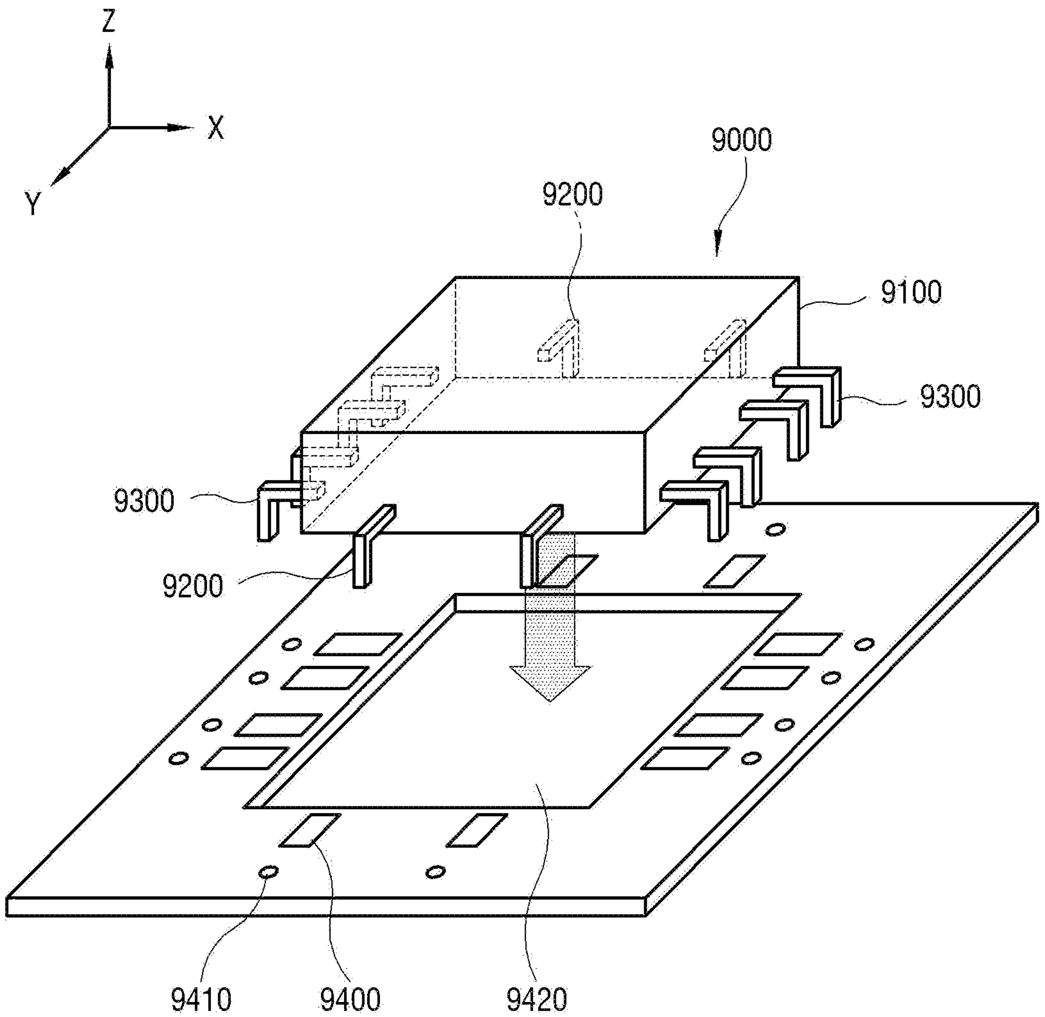
FIG. 13 is a perspective view illustrating a structure of a power supply where a transformer device is mount on a PCB.

FIG. 13 is a perspective view illustrating a structure of a power supply where a transformer device is mount on a PCB.

As illustrated in FIG. 13, the power supply includes a transformer device 9000 and a PCB 9400. The transformer device 9000 includes a device body 9100. Because a structure of the device body 9100 is substantially the same as that of the above-described embodiment, the detailed description will be omitted. On four direction edges of the device body 9100, a plurality of leads 9200 and 9300 are provided. The plurality of leads 9200 and 9300 include a plurality of serial leads 9200 which correspond to a serial connection to a transformer circuitry in the device body 9100 and a plurality of parallel leads 9300 which correspond to a parallel connection to the transformer circuitry.

The plurality of serial leads 9200 are connected to the terminal D11, the terminal D21, the terminal D12 and the terminal D22, respectively, in the above-described embodiment (see FIG. 7). Meanwhile, the plurality of parallel leads 9300 are connected to the terminal A11, the terminal A21, the terminal A13, the terminal A23, the terminal A12, the terminal A22, the terminal A14 and the terminal A24, respectively, in the above-described embodiment (see FIG. 7). That is, the transformer device 9000 in this embodiment does not include the plurality of connectors 1310, 1320, 1330 and 1340 (see FIG. 1) but has a structure including the plurality of leads 9200 and 9300 which extend from each of the terminals out of the device body 9100. The plurality of leads 9200 and 9300 extend from a side wall of the device body 9100 and bend downwards. That is, each lead 9200 or 9300 has an end part which extends and bends in the −Z direction.

Meanwhile, the PCB 9400 includes lead accommodating holes 9410 which accommodate the end parts of the leads 9200 and 9300 on a flat surface. The end part of each lead 9200 or 9300 is accommodated by the lead accommodating hole 9410 from an upper side of the PCB 9400, where the end part of each lead 9200 or 9300 is soldered in the lead accommodating hole 9410 so that the transformer device 9000 is mounted on the PCB 9400. By this configuration, wirings of the PCB 9400 are electrically connected to the transformer device 9000. Also, the lead accommodating holes 9410 perform a role of preventing the leads 9200 and 9300 from coming out of the PCB 9400 during soldering.

The PCB 9400 may further include a device accommodating hole 9420 which accommodates the transformer device 9000. Without having the device accommodating hole 9420, the transformer device 9000 would be mounted on the PCB 9400 in a manner to be sit on an upper surface of the PCB 9400. Meanwhile, if the transformer device 9000 is mounted on the PCB 9400 as accommodated in the device accommodating hole 9420, it is possible to reduce a thickness of the power supply by a thickness of the PCB 9400.

Figure 14:
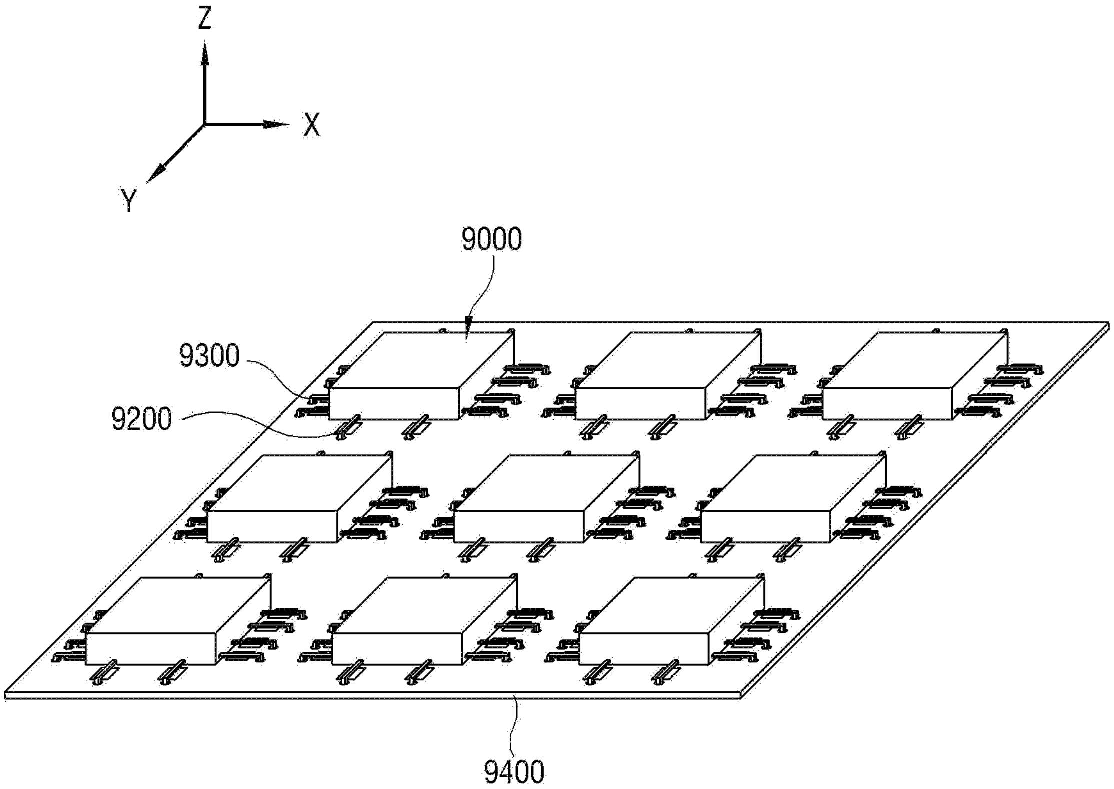
FIG. 14 is a perspective view illustrating a plurality of transformer devices which are mounted on such a PCB of FIG. 13.

FIG. 14 is a perspective view illustrating a plurality of transformer devices which are mounted on such a PCB of FIG. 13.

As illustrated in FIG. 14, a plurality of transformer devices 9000 are mounted on a PCB 9400 so that a power supply may be configured. Serial leads 9200 and parallel leads 9300 of each of the transformer devices 9000 are electrically connected to the PCB 9400 according to the structure of FIG. 13. Wirings on the PCB 9400 are provided to allow the serial leads 9200 or the parallel leads 9300 to be interconnected with another transformer device 9000. According to how the plurality of transformer devices 9000 are mounted on the PCB 9400, the plurality of transformer device 9000 may be connected in serial or parallel.

The operation of circuitry according to the serial or parallel connection of the plurality of transformer devices 9000 has been described in the above-described embodiments and further description will be omitted in this embodiment.

What is claimed is:

1. A transformer device comprising:

a device body comprising a transformer circuitry including an input side coil and an output side coil; and a plurality of terminals provided on side walls of the device body, wherein the transformer circuitry is configured to be connected to a transformer circuitry of a first another transformer device or a transformer circuitry of a second another transformer device to increase a voltage or current provided to a load, wherein the plurality of terminals comprise:

a first terminal provided on a first side wall of the side walls and connected to the input side coil in serial, a second terminal provided on the first side wall and connected to the output side coil in serial, wherein the first terminal and the second terminal are configured to be connected to the transformer circuitry of the first another transformer device through a first cable in serial to increase the voltage provided to the load, a pair of third terminals provided on a second side wall of the side walls and connected to the input side coil in parallel, and a pair of fourth terminals provided on the second side wall and connected to the output side coil in parallel, wherein the pair of third terminals and the pair of fourth terminals are configured to be connected to the transformer circuitry of the second another transformer device through a second cable in parallel to increase the current provided to the load.

2. The transformer device according to claim 1, wherein each of the first cable and the second cable comprises a flexible cable.

3. The transformer device according to claim 1, wherein the plurality of terminals further comprise a pair of terminals provided on a third side wall of the side walls, the third side wall being opposite to the first side wall.

4. The transformer device according to claim 3, wherein the plurality of terminals further comprise a pair of terminals provided on a fourth side wall of the side walls, the fourth side wall being opposite to the second side wall.

5. The transformer device according to claim 1, wherein the device body comprises a marker provided to identify an orientation of the transformer device.

6. The transformer device according to claim 1, wherein the first and second terminals and the third and fourth terminals are provided to have different shapes to each other.

7. The transformer device according to claim 1, wherein the input side coil is applied with an input voltage and the output side coil is isolated from the input side coil and outputs an output voltage corresponding to the input voltage which has been adjusted.

8. The transformer device according to claim 7, wherein the first terminal is provided to connect the input side coil of the transformer circuitry of the transformer device and an input side coil of the transformer circuitry of the first another transformer device with each other and the second terminal is provided to connect the output side coil of the transformer circuitry of the transformer device and an output side coil of the transformer circuitry of the first another transformer device with each other in serial.

9. A transformer device comprising:

a device body comprising a transformer circuitry including an input side coil and an output side coil; and a plurality of terminals provided on side walls of the device body, wherein the transformer circuitry is configured to be connected to a transformer circuitry of another transformer device to increase a voltage or current provided to a load, wherein the plurality of terminals comprise:

a first terminal provided on a first side wall of the side walls and connected to the input side coil in serial, a second terminal provided on the first side wall and connected to the output side coil in serial, wherein the first terminal is configured to be connected to the transformer circuitry of the another transformer device through a first cable in serial to increase the voltage provided to the load, a pair of terminals provided on a second side wall of the side walls and connected to the output side coil in parallel, wherein the input side coil of the transformer circuitry of the transformer device is connected to an input side coil of the transformer circuitry of the another transformer device via the first cable in serial through the first terminal and the output side coil of the transformer circuitry of the transformer device is not connected to an output side coil of the transformer circuitry of the another transformer device in serial, and wherein the output side coil of the transformer circuitry of the transformer device is connected to the output side coil of the transformer circuitry of the another transformer device through a pair of second cables in parallel via a circuit board.

10. An electronic device comprising a power supply having a plurality of transformer devices to supply a voltage, each of the plurality of transformer devices comprising:

a device body including a transformer circuitry including an input side coil and an output side coil; and a plurality of terminals provided on side walls of the device body, wherein the transformer circuitry is configured to be connected to a transformer circuitry of a first another transformer device among the plurality of transformer devices or a transformer circuitry of a second another transformer device among the plurality of transformer devices to increase a voltage or current provided to a load, and wherein the plurality of terminals comprise:

a first terminal provided on a first side wall of the side walls and connected to the input side coil in serial, a second terminal provided on the first side wall and connected to the output side coil in serial, wherein the first terminal and the second terminal are configured to be connected to the transformer circuitry of the first another transformer device through a first cable in serial to increase the voltage provided to the load, a pair of third terminals provided on a second side wall of the side walls and connected to the input side coil in parallel, and a pair of fourth terminals provided on the second side wall and connected to the output side coil in parallel, wherein the pair of third terminals and the pair of fourth terminals are configured to be connected to the transformer circuitry of the second another transformer device through a second cable in parallel to increase the current provided to the load.

11. The electronic device according to claim 10, wherein each of the first cable and the second cable comprises a flexible cable.

12. The electronic device according to claim 10, wherein the plurality of terminals further comprise a pair of terminals provided on a third side wall of the side walls, the third wall being opposite to the first side wall.

13. The electronic device according to claim 12, wherein the plurality of terminals further comprise a pair of terminals provided on a fourth side wall of the side walls, the fourth side wall being opposite to the second side wall.

14. The electronic device according to claim 10, wherein the device body comprises a marker provided to identify an orientation of a corresponding transformer device of the plurality of transformer devices.

* * * * *